Patented July 11, 1939

2,165,371

UNITED STATES PATENT OFFICE 2,165,371

SARCOMA ANTIGEN

Benjamin Gruskin, Philadelphia, Pa., assignor to Lakeland Foundation, Chicago, Ill., a corporation of Illinois No Drawing. Application October 6, 1936, Serial No. 104,342

9 Claims. (Cl. 167—78)

This invention relates to a substance commonly called an antigen.

More specifically the invention is concerned with the diagnosis of malignant tumors and comprehends the provision of an extract of a material comprising a characteristic protein which will incite a specific sensitization to a homologous protein contained in the body of an animal by producing a pseudopodic reaction when introduced intradermally into the said animal body. In view of this action the present agent or antigen may also or alternatively be termed a sensitizing agent. By the term "antigen" as used in the following specification and claims it is intended to cover and refer to such products.

More particularly, the invention contemplates the provision of an antigen for use in the diagnosis of malignant tumors known as cancer, there being two types of malignant tumors, namely, carcinoma and sarcoma. Carcinoma is a malignant tumor of the epithelial (cells forming an unbroken sheet or membrane) type, while the connective tissue type is known as sarcoma. This invention and discovery relates to the antigen for use in connection with the diagnosis of the connective tissue type of tumor, which is sarcoma.

This application is a continuation in part of application Serial Nos. 636,023 and 636,024, each filed October 3, 1932, and of application Serial No. 731,115, filed June 18, 1934.

The present invention is based upon and explained by the following theory which is set out herein for the purpose of better defining the invention and the principles involved therein, namely, that malignant tumor cells are embryonic in their inception and continue to remain embryonic, in contra-distinction to other cells of the body which are embryonic in inception but which later mature. That is to say, the embryonic connective tissue cells of sarcoma never mature but tend to remain in their embryonic form, thus characterizing the onset of the disease.

It is a biological fact that if an extract of a known homologous protein, which is a substance characteristic of living matter, is added to or brought into contact with serum of an animal that has been injected with that protein, a precipitation or flocculation, or a reaction or immunization takes place. This biological fact is conventionally availed and employed in the identification of various types of proteinaceous animal products, for example, by inspection agencies. Therefore, upon the theory herein expounded, and of which innumerable tests have proven correct, an antigen made of embryonic connective tissue cells added to or brought into contact with the serum of a patient suffering from sarcoma, will cause a reaction or immunization, or flocculation or precipitation to take place. So also, when an antigen made from embryonic connective tissue cells and containing a specific protein homologous to the protein characteristic of sarcoma is intradermally injected into the body of a patient suffering from sarcoma a characteristic allergic or pseudopodic reaction occurs.

The primary object of the present invention is to provide a new antigen which may be used in determining whether or not a person is afflicted with sarcoma.

Another object is the provision of an antigen for use in the diagnosis of sarcoma to determine whether or not malignancy exists by the science of serum diagnosis or serologically testing the serum of a patient.

A further object is the provision of an antigen made from embryonic connective tissue cells, which are obtained from the substance known as "Wharton's jelly", found in the human umbilical cord, and containing embryonic connective tissue, particularly stellate connective tissue cells, treating and mixing the cells to obtain a protein, prepared and treated in accordance with a predetermined sequence and formula.

An additional object is to provide a highly perfected method of synthesis for an antigen whereby a pure antigen is obtained which in use is characterized by a high degree of accuracy.

A further object is to provide a new antigen for determining whether or not a human being is afflicted with sarcoma by injecting the antigen intradermally.

A still further object of the invention and discovery is to provide a test to determine whether or not a human being is afflicted with sarcoma by giving intradermal injections of a suitable antigen and preserving the results of the injections particularly with regard to the formation or absence of formation of pseudopods, the occurrence of a pseudopodic reaction indicating positively the presence of specific sarcomatous protein in the body of the patient and, accordingly, the presence of a sarcomatous growth in the individual.

Numerous other objects and advantages will be apparent throughout the progress of the following specification.

Proceeding on the basis that sarcoma cells are embryonic connective tissue cells, always remain embryonic and never mature, a protein from these cells, when brought into contact with a patient's serum containing a characteristic sarcomatous protein causes a flocculation or precipitation or a reaction.

The embryonic connective tissue cells from which the antigen is made are preferably obtained from the gelatinous substance present in the umbilical cord, and particularly the human umbilical cord which substance is technically known as "Wharton's jelly".

Human umbilical cords or the umbilical cords of mammalians are collected in a sterile flask containing a sterile saline solution made up in the preparation of 8.5 grams of sodium chloride in a liter of distilled water. The cords should be not more than one day old when used, and any cords which are not white and in good condition should be discarded. The cords are cleaned of any excess blood, in the three vessels of the cord, by pressing out the cord with a clean gauze sponge. The cleaning of the cord is facilitated if the cord is cut into short pieces of about four inches in length. The cord should be kept either in or constantly wetted with saline solution while the pieces of the cord are being cleaned, which pieces may be cleaned on several thicknesses of sterile paper towels. After the blood has been squeezed out of the cord, a surgical knife is employed to completely cut around the large vessel and it is carefully dissected from its place. The large vessel of the cord is cut open and wiped free from blood with a clean gauze sponge which may be wet with saline solution. The two smaller vessels of the cord are similarly dissected from their normal position with a knife and using toothed forceps. The clean pieces of the cords are collected in sterilized saline solution until the cleaning process has been completed. The clean pieces of the cords are then put into a meat press of the cone-type, and ground, collecting the resultant jelly in a container separate from the pieces of the cord. The pieces of the cord may be put through the press several times in order to remove all the jelly therefrom. Any small pieces of the cord which may get into the jelly should be immediately removed. This may be done by filtering the jelly through a sterilized Gooch crucible padded with several layers of surgical gauze, or filtering through glass wool. The jelly which is so obtained is termed "Wharton's jelly". The "Wharton's jelly" is then carefully and slowly dried in an oven until it has dried sufficiently, so that it may be ground into powder. Care should be taken that the jelly will not become scorched during the drying operation.

The dried cells are next treated to a process of washing or extracting with ether in the following manner.

The cells, dried in the above manner, are then placed in a test tube and ether, i. e., ethyl ether known commercially as sulfuric ether, is added to cover the cells preferably in three times the approximate volume of the cells. The mixture is shaken to completely wash the cells therein and is permitted to stand for two hours. The container is carefully covered meanwhile. After this period the ether may be poured off. If sufficient settling has not taken place, the product should be centrifuged at a medium speed for five minutes or so when the ether may be readily decanted from the mass of cells. After this operation it is preferred that the mass of cells, still wet with ether, be permitted to dry. This is, of course, readily accomplished in view of the volatile nature of ether. Fresh ether is again added in about the same amount as before and the operation again carried out in the same manner. This operation is repeated until the cells have been washed in ether for three separate times.

When the jelly is dried it is placed in acetone of five times its volume. The acetone is then poured off from the dried jelly, and when all the acetone has completely evaporated from the jelly, the dried jelly is placed in a mortar and ground to an impalpable powder, to about the consistency of a fine talcum powder. The dried powdered jelly so obtained should be stored in sterilized airtight containers.

The purpose of the oven drying operation is for dehydration. The dehydration of the cells can be done better, and quicker, and without danger of scorching by dehydrating the jelly with acetone only.

The dried powdered jelly of the umbilical cord is then extracted with one-tenth normal sodium hydroxide in the proportion of one-tenth gram to two-tenths gram, preferably two-tenths gram, of dried cells to ten cubic centimeters of the one-tenth normal sodium hydroxide. The normal sodium hydroxide (NaOH, C. P.) is made up in the proportions of one liter of distilled water in a volumetric flask to four grams of sodium hydroxide, C. P. The powdered cells to which the one-tenth normal sodium hydroxide is added is first ground to a smooth paste with a few cubic centimeters of the sodium hydroxide, after which time the remaining amount of the ten cubic centimeters of the normal sodium hydroxide is added slowly. The cells and sodium hydroxide are carefully mixed so that a perfectly smooth suspension of the cells in the sodium hydroxide will be obtained. The extract, the cells and the sodium hydroxide, are then poured into large containers such as large test tubes and allowed to stand for 24 hours. After this time it is preferred that the liquid and its contents be centrifuged at medium speed for twenty minutes in order to permit complete and full separation of the supernatant liquid, which may then be pipetted off or otherwise separated. The volume of the supernatant solution should be measured with a sterilized graduate. This supernatant solution is the alkaline extract of the jelly, and is placed in a sterile bottle of a volume more than twice that of the extracts so as to allow for the addition of an acid and buffer solution which is used in neutralizing.

The acid and buffer solution for neutralizing the alkaline extract is made up in the proportion of 2.27 of anhydrous C. P. primary potassium phosphate ($KH_2PO_4$) and 4.235 cubic centimeters of concentrated hydrochloric acid (HCl), specific gravity 1.18–1.19, 35 per cent. solution made up to one liter with distilled water in a volumetric flask. This gives a solution which is .05 normal with respect to the hydrochloric acid and .05 normal with respect to primary potassium phosphate, anhydrous.

An equal amount of the acid and buffer solution just described may be added to the alkaline extract which has been pipetted off from the cells and measured. The acid solution should be added slowly, and the solutions carefully stirred and gently agitated while the acid and buffer solution is being added. After an equal amount of the acid and buffer solution has been added to the alkaline extract of the cells, a few more cubic centimeters of the acid and buffer solution may be added. The resultant solution should then be tested to see if the neutralization is nearing the end point. This testing should be repeated frequently to make certain that the titration does not go past the end point, which is pH 6.9 for this process. If the resultant solution becomes too acid, the protein of the antigen will be precipitated. The antigen should be checked electrometrically if possible, and if not possible, it may be checked by the use of a spot plate, and checked against a standard solution of pH 6.9. Brom-thymol-blue is used as an indicator.

The standard solution just referred to, is well known, and is made up of anhydrous primary potassium sulphate, $\frac{1}{15}$ molar, 9.078 grams of pure salt in one liter of freshly distilled water, in a volumetric flask, and anhydrous secondary sodium phosphate, $\frac{1}{15}$ molar, 9.472 grams of pure salt made up to one liter with freshly distilled water in a volumetric flask. The solutions are combined in a pyrex container in the proportion of 4.9 parts of the solution of primary potassium phosphate to 5.1 parts of secondary sodium phosphate solution. The mixture of these two solutions gives a solution with a pH of 6.9.

The solution is now passed through a number V Berkfield filter to remove any foreign matter or bacterial contamination. This filtering step may be applied prior to the addition of acid and buffer in another preferred embodiment of the invention, that is after decantation or pipetting off the supernatant-alkaline extract.

When the end point of the titaration is reached, as ascertained by the electrometric method, or by the matching of the antigen to the standard solution of pH 6.9, a preservative consisting of a solution of tri-cresol and glycerin C. P. in the proportion of one part of tri-cresol to two parts of glycerin, may be added.

The total volume of the finished antigen, that is, including the volume of the alkaline extract and the added volume of the acid and buffer solution, is calculated, and to each ten cubic centimeters of antigen there is added two drops of the tri-cresol and glycerin preservative. Two drops are added by the use of a capillary pipette having an internal diameter of one millimeter at the dropping end. A sterile stopper is placed in the bottle containing the antigen, and its preservative, and the solution should be shaken thoroughly so that the preservative will be disbursed evenly throughout the antigen. A rubber stopper of the cap type is preferably used on the bottle containing the antigen, so that the solution may be withdrawn by means of a syringe and needle for conducting the intradermal test, and the bottle need not be opened.

After the preservative has been added to the antigen, and the solution thoroughly shaken, the finished antigen is heated to about 80° C. for five minutes. This treatment apparently has the function of destroying or changing to a harmless form any impurities which might interfere with the use of the antigen.

The antigen may be withdrawn from the container by means of a Pyrex syringe, and put into small vials for use. Vials of five cubic centimeter capacity have been found convenient.

It is essential to use glass containers of Pyrex for the reason that ordinary glass seems to give up alkali to the product and thus change its character.

Five hundredths (.05) of one (1) c. c. of the above antigen is drawn off in a small syringe to which there is attached a very fine short needle. The antigen is injected intradermally, after first sterilizing and treating the surface of the patient's skin and rendering it perfectly dry. The injection is performed by stretching the skin with one hand and injecting the antigen intradermally, the injection being made by the usual intradermal method. In positive cases, that is, in cases where the patient examined has sarcoma, a slight area of inflammation will be noticed surrounding the small bubble termed a "bleb", which occurs from the injection, and pseudopods will form, pseudopods being radial elongations extending outwardly from the edges of the bleb. In negative cases, that is, in cases where the patient does not have sarcoma, no pseudopod formation will take place.

The above described antigen is for the intradermal test, and is known as the dry method. A similar method known as the wet method is the same as the present method, except the Wharton's jelly is not dried, being left in its wet state.

The invention and discovery herein set forth designates, to a high degree of certainty, whether or not a patient is afflicted with sarcoma. The antigen herein described are made from embryonic connective tissue cells of the umbilical cord, and while the exact methods and tests herein described are preferable, it is to be understood that various changes, to a certain degree, may be made, without departing from the spirit of the invention or sacrificing any of its advantages, and the right is hereby reserved to make all such changes as fairly fall within the scope of the following claims.

The invention is hereby claimed as follows:

1. An antigen specific to the diagnosis of sarcoma by intradermal injection comprising a neutralized, inorganic alkaline hydroxide extract of embryonic connective tissue cells obtained from embryo mammals.

2. An antigen specific to the diagnosis of sarcoma by intradermal injection comprising a neutralized, inorganic, alkaline hydroxide extract of embryonic connective tissue cells obtained from embryo mammals having a pH of substantially 6.9.

3. An antigen specific to the diagnosis of sarcoma by intradermal injection comprising a neutralized, sodium hydroxide extract of embryonic connective tissue cells from embryo mammals.

4. The process of making an antigen for intradermal use to determine diagnostically the existence of sarcoma comprising extracting embryonic connective tissue cells obtained from embryo mammals with an inorganic, alkaline hydroxide, separating the extract, and then neutralizing the extract.

5. The process of making an antigen for intradermal use to determine diagnostically the existence of sarcoma comprising obtaining an inorganic alkaline hydroxide extract of embryonic connective tissue cells, and then adding an acid and buffer solution to reduce the extract to a pH of approximately 6.9.

6. An antigen to determine diagnostically the existence of sarcoma in a mammalian comprising an extract of embryonic connective tissue cells obtained from embryo mammals and adapted for intradermal injection, which extract contains a specific protein homologous to the specific sarcomatous protein of a mammalian having sarcoma and which produces a skin reaction by pseudopod formation when the antigen is injected intradermally into an animal afflicted with sarcoma.

7. An antigen specific to the diagnostic determination of sarcoma by intradermal injection comprising a neutralized, sodium hydroxide extract of embryonic connective tissue cells obtained from the human embryo.

8. The process of making an antigen for intradermal use to determine diagnostically the existence of sarcoma which comprises extracting embryonic connective tissue cells obtained from Wharton's jelly with sodium hydroxide, separating the extract, and then neutralizing and buffering the extract.

9. The process of making an antigen for intradermal use to determine diagnostically the existence of sarcoma comprising extracting embryonic connective tissue cells from the human umbilical cord with substantially one-tenth normal sodium hydroxide, and then adding an acid and buffer solution to neutralize the extract to a pH of substantially 6.9.

BENJAMIN GRUSKIN.